(12) United States Patent
Morton (10) Patent No.: US 10,458,671 B2
(45) Date of Patent: Oct. 29, 2019

(54) BUILDING CONTROL DEVICE HAVING PROBABILITY DISTRIBUTION BASED SENSING

(71) Applicant: Ademco Inc., Golden Valley, MN (US)

(72) Inventor: Blaise Grayson Morton, Minnetonka, MN (US)

(73) Assignee: Ademco Inc., Golden Valley, MN (US)

(*) Notice: Subject to any disclaimer, the term of this patent is extended or adjusted under 35 U.S.C. 154(b) by 0 days.

(21) Appl. No.: 15/950,078

(22) Filed: Apr. 10, 2018

(65) Prior Publication Data

US 2018/0292101 A1    Oct. 11, 2018

Related U.S. Application Data

(60) Provisional application No. 62/484,339, filed on Apr. 11, 2017.

(51) Int. Cl.
| | |
|---|---|
| F24F 11/65 | (2018.01) |
| F24F 11/49 | (2018.01) |
| F24F 11/523 | (2018.01) |
| F24F 11/64 | (2018.01) |
| G05B 19/042 | (2006.01) |
| F24F 11/58 | (2018.01) |
| G05B 15/02 | (2006.01) |
| F24F 110/10 | (2018.01) |

(52) U.S. Cl.
CPC .............. *F24F 11/65* (2018.01); *F24F 11/49* (2018.01); *F24F 11/523* (2018.01); *F24F 11/58* (2018.01); *F24F 11/64* (2018.01); *G05B 15/02* (2013.01); *G05B 19/0426* (2013.01); *F24F 2110/10* (2018.01); *G05B 2219/25011* (2013.01); *G05B 2219/2642* (2013.01)

(58) Field of Classification Search
None
See application file for complete search history.

(56) References Cited

U.S. PATENT DOCUMENTS

| 6,882,964 B2 | 4/2005 | Bayard | |
|---|---|---|---|
| 2011/0093424 A1* | 4/2011 | Zimmermann | G05B 17/02 706/47 |
| 2012/0303572 A1* | 11/2012 | Isozaki | G06K 9/6277 706/52 |

OTHER PUBLICATIONS

Cheng, J. et al, "A Novel Optimal Configuration form Redundant MEMS Inertial Sensors Based on the Orthogonal Rotation Method," Sensors 2014, vol. 14:13661-13678. Jul. 29, 2014.

(Continued)

*Primary Examiner* — Ryan A Jarrett
(74) *Attorney, Agent, or Firm* — Shumaker & Sieffert, P.A.

(57) ABSTRACT

A building control device for estimating temperature of a space incorporating environmental sensors, a memory, and a controller. The controller may receive detected environmental conditions, identify operational environmental states, obtain a probability distribution for each operational environmental state, determine temperature estimates and a probability estimate for each temperature estimate, identify an operational environmental state at which the set of environmental sensors are likely operating, select a temperature estimate for the operational environmental state at which the set environmental sensors are likely operating, and generate the selected temperature estimate.

20 Claims, 5 Drawing Sheets

(56) References Cited

OTHER PUBLICATIONS

"Why Is the Temperature My Nest Thermostat Detects Different Than My Old Thermostat?" 1 page, 2018. https://nest.com/support/article/Why-does-the-temperature-Nest-detects-seem-different-than-my-old-thermostat downloaded Mar. 23, 2016.
"Residential Controls—Electrical Wall-Mounted Room Thermostats," NEMA DC 3-23, 8 pages, Jan. 2013.
Eberwein, "Residential Smart Thermostat Test Lab—Phase One," PG&E's Emerging Technologies Program, ET13PGE1462, Dec. 26, 2014.
Jaynes, "Probability Theory The Logic of Science," pp. 1-727. Cambridge University Press, 2003.

\* cited by examiner

BUILDING CONTROL DEVICE HAVING PROBABILITY DISTRIBUTION BASED SENSING

This patent application claims the benefit of U.S. Provisional Patent Application Ser. No. 62/484,339, filed Apr. 11, 2017, and entitled "Thermostat Calibrated Using Pairwise Correlation of Sensor Residual Errors and Maximum Entropy +Maximum Likelihood Techniques". U.S. Provisional Patent Application Ser. No. 62/484,339, filed Apr. 11, 2017, is hereby incorporated by reference.

BACKGROUND

The present disclosure may relate generally to building control devices, and particularly to building control devices for use with building automation systems.

Sensor system performance and reliability may be enhanced by building sensor packages containing multiple copies of sensor elements in redundant configurations, such as using multi-element thermal sensors. Additionally, there are many possible tests for evaluating the temperature accuracy of thermostats. However, while industry may recognize the potential benefits of redundant configurations of microelectronic and microelectromechanical (MEMS) sensors, and that such sensors are currently being used in products, there does not appear to be a thermostat that takes full advantage of the correlation of sensor ensemble errors.

SUMMARY

The disclosure reveals a building control device for estimating temperature of a space incorporating environmental sensors, a memory, and a controller. The controller may receive detected environmental conditions, identify operational environmental states, obtain a probability distribution for each operational environmental state, determine temperature estimates and a probability estimate for each temperature estimate, identify an operational environmental state at which the set of environmental sensors are likely operating, select a temperature estimate for the operational environmental state at which the set environmental sensors are likely operating, and generate the selected temperature estimate. The above summary is not necessarily intended to describe each disclosed embodiment or every implementation of the present disclosure. The Figures and Description which follow more particularly exemplify these and other illustrative embodiments.

BRIEF DESCRIPTION OF THE DRAWING

The disclosure may be more completely understood in consideration of the following description in connection with the accompanying drawings, in which.

While the disclosure is amenable to various modifications and alternative forms, specifics thereof have been shown by way of example in the drawings and will be described in detail. It may be understood, however, that the intention is not to limit the disclosure to the particular embodiments described. On the contrary, the intention is to cover all modifications, equivalents, and alternatives falling within the spirit and scope of the disclosure.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

For the following defined terms, these definitions may be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", and so forth, indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure. Although examples of construction, dimensions, and materials may be illustrated for the various elements, those skilled in the art will recognize that many of the examples provided have suitable alternatives that may be utilized.

According to various embodiments, a building control device, such as a thermostat, for example, may be disclosed having on a configuration of environmental sensors. In some cases, the thermostat may identify a residual error for the sensors and produce a temperature estimate of a space. For example, in some cases, a set of operational environmental states at which the sensors operate may be determined from the residual errors for each sensor. In some cases, a Joint Probability Distribution (JPD) may then be computed from the residual errors of the sensors at each given environmental state. In some instances, the sensors of the building control device may then detect environmental conditions, such as a temperature of the space. The building control device may then identify a subset of operational environmental states from the determined set of operational environmental states at which the sensors may be operating. In some instances, for each identified operational environmental state, the JPD may be obtained. The building control device may then use the JPD and the detected temperature to determine a set of temperature estimates and a probability estimate for each temperature estimate. The building control device may then use the probability estimates to identify the operational environmental state or states at which the sensors are likely operating. In some cases, the temperature estimate for the operational environmental state or states at which the sensors are likely operating may be selected and generated to provide a more accurate temperature measurement of the space.

Figure 1:
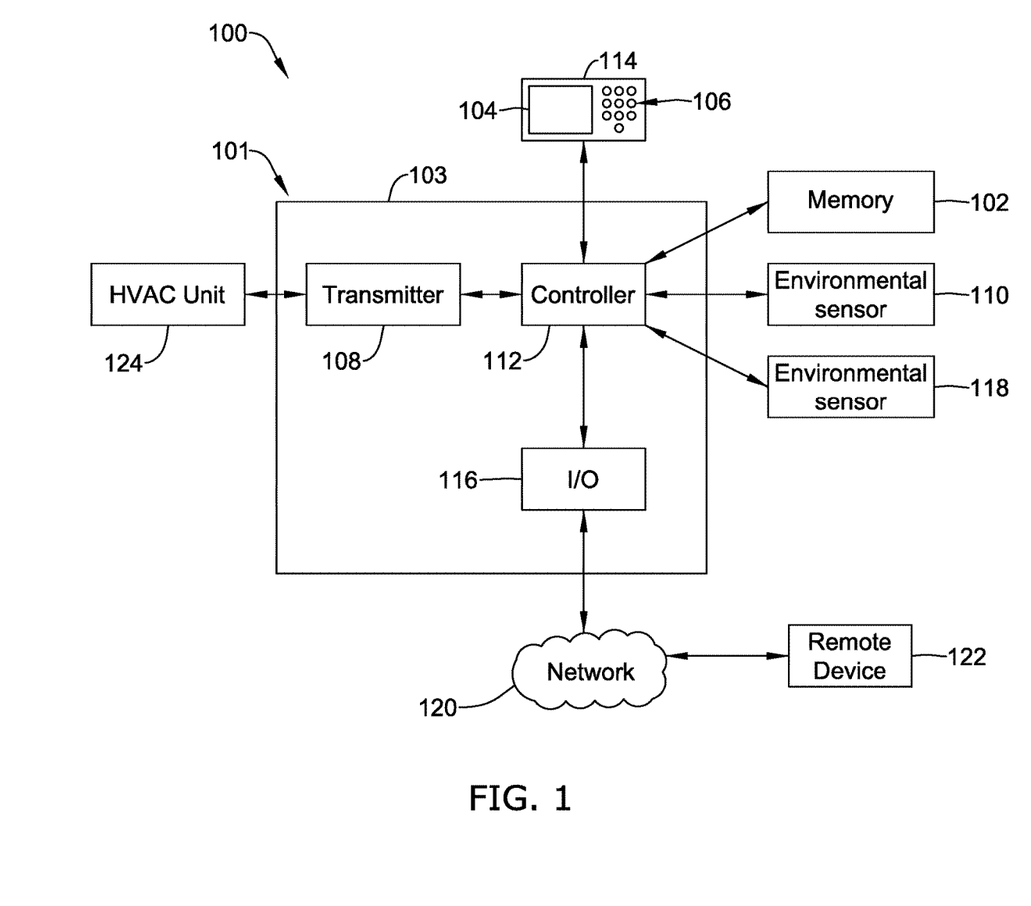
FIG. 1 is a schematic block diagram of an illustrative building control system.

Turning now to the figures, FIG. 1 is a schematic block diagram of an illustrative building control system 100. In some cases, the building control system 100 may include a building control device 101. The building control device 101 (e.g., a thermostat) may include a controller 112 (e.g., microcontroller, microprocessor, and the like) operatively coupled to a memory 102, a user interface 114, transmitter 108 (sometimes a transceiver), environmental sensors 110 and 118, and an I/O port 116. The environmental sensors 110, 118 (e.g., a temperature sensor(s), humidity sensor(s), wind or blower sensor(s), atmospheric sensor(s), microelectronic sensors, microelectromechanical sensors, and other sensors) may be located in a housing 103 of the building control device 101 and/or located remotely from the building control device 101.

The transmitter 108 may be configured to communicate using one or more wireless communication protocols, such as cellular communication, ZigBee, REDLINK™, Bluetooth, Wi-Fi, IrDA, infra-red (IR), dedicated short range communication (DSRC), EnOcean, and/or any other suitable common or proprietary wireless protocol, as desired. In some cases, the transmitter 108 may communicate commands from the building control device 101 to a remotely located HVAC unit 124 via a communication protocol. The HVAC unit 124 may receive the commands from the transmitter 108, and when appropriate, execute the received commands. Commands that may be sent to the HVAC unit 124 from the building control device 101 may include, for example, a command to change a setpoint temperature of the HVAC unit 124, change a mode (heat, cool) of the HVAC unit 124, and so on.

In some instances, the controller 112 may include a pre-programmed chip, such as a very-large-scale integration (VLSI) chip and/or an application specific integrated circuit (ASIC). In such embodiments, the chip may be pre-programmed with control logic in order to control the operation of the building control device 101. In some cases, the pre-programmed chip may implement a state machine that performs the desired functions. By using a pre-programmed chip, the controller 112 may use less power than other programmable circuits (e.g., general purpose programmable microprocessors) while still being able to maintain basic functionality. In other instances, the controller 112 may include a programmable microprocessor. Such a programmable microprocessor may allow a user to modify the control logic of the building control device 101 even after it is installed in the field (e.g., firmware update), which may allow for greater flexibility of the building control device 101 in the field over using a pre-programmed ASIC.

In some cases, the controller 112 may cause the building control device 101 to produce a temperature estimate of a space in accordance with the JPD's computed from the residual errors of the sensors.

In the example shown in FIG. 1, the user interface 114 is operatively coupled to the controller 112, and permits the building control device 101 to display and/or solicit information, such as operational parameters for the HVAC unit 224, as well as accept one or more user interactions with the building control device 101, such as requests for environmental conditions (e.g., temperature, humidity, and so on), of a space. Through the user interface 114, the user may, for example, request and view environmental conditions (e.g., temperature estimates, estimated humidity, and so on), of a space and/or manage the operation of one or more HVAC units (e.g., HVAC unit 124, and the like) that service a space, such as a space within a building, house, or structure. In some cases, the user may be able to group one or more HVAC units to form an operating group to establish operating zones within the building, home, or structure.

In some cases, the user interface 114 may be a physical user interface that is accessible at the building control device 101 and may include a display 104 and/or a distinct input device such as keypad 106. The display 104 may be any suitable display. In some instances, the display 104 may include or may be a liquid crystal display (LCD), an OLED, and other types of display technologies, and in some cases a fixed segment display, a dot matrix LCD display, a 7-segment type display, and/or may include one or more LEDs. In some cases, the display 104 may include a touch screen LCD panel that functions as both the display 104 and keypad 106. The user interface 114 may be adapted to solicit requests for environmental conditions (e.g., temperature estimate, estimated humidity, and so on), but this is not required. In some cases, the user interface 114 may be provided as a separate unit from the building control device 101, and may facilitate a user's interactions with the building control device 101 located within the building, house, or structure. For example, the user interface 114 may be provided as part of a remote device (e.g., remote device 122), such as a smart phone, a tablet computer, a laptop computer, or a desktop computer. In some cases, the user interface 114 may communicate with the building control device 101 via a network such as, for example, a network 120 (e.g., Internet, Wi-Fi, and so forth).

The memory 102 of the building control device 101 may be operatively coupled to the controller 112 and may be used to store any desired information, such as the aforementioned operational environmental states at which the sensors operate, the JPD's of the sensors at each operational environmental state, a bias for each sensor, residual measurements, and the like. The memory 102 may be any suitable type of storage device including, but not limited to, RAM, ROM, EPROM, flash memory (e.g., NAND flash memory), an external SPI flash memory, a hard drive, and/or the like. In some cases, the memory 102 may include two or more types of memory. For example, the memory 102 may include a RAM, a ROM and a flash memory module.

In some cases, the controller 112 may store information within the memory 102, and may subsequently retrieve the stored information from the memory 102. For example, the controller 112 may identify a finite set of environmental states in which the sensors 110, 118 may operate. A calibration model or equation may then be used to compute a set of calibration parameters for each operational environmental state. In some cases, the set of calibration parameters may be preconfigured during fabrication of the building control device 101 based on a set of sensor measurements done in a lab or any suitable manufacturing facility. A set of residual errors for each sensor 110, 118 and for each pair of sensors, may then be computed and fitted into a histogram. In some instances, the JPD for each operational environmental state may be computed from the residual errors. As an example, in some cases, the entropy-maximizing JPD for each operational environmental state that is compatible with the residual errors may be computed. The controller 112 may then store the entropy-maximizing JPD for each operational environmental state for each sensor 110, 118 in memory 102.

During operation of the building control device 101, a user may request to see the temperature of the room in which the building control device 101 and/or the sensors 110, 118 are located, using the user interface 114. The sensors 110, 118 may then then detect the environmental conditions, such as a temperature of the room. In some cases, the operational environmental states stored in the memory may be bounded by a range of reference temperatures that the building control device 101 (i.e., the controller 112) is trying to estimate accurately. For example, for a set of operational environmental states of a sensor 110 or 118, the range of reference temperatures may lie within 1 degree F. of 65 degrees F. For each operational environment state from the set, an estimate of the temperature may be computed, given the reference temperature measurements detected by the sensors 110, 118. In this example, the JPD for each operational environmental state that had a detected reference temperature from any of sensors 110, 118 that was between 64 degrees F. and 66 degrees F., may be obtained from the memory 102. Using the JPD's, a set of estimation temperatures and a probability estimate for each temperature estimate may be computed. The probability estimates may then be used to determine the likely operational environmental states of the sensors 110, 118. In some cases, the likely operational environmental states of the sensors 110, 118 may have temperature estimates that have the highest overall probability estimates with respect to the JPD's. This approach may be similar to a Maximum Likelihood Estimation (MLE). Another possibility is to interpolate the temperature estimates among those operational environmental states for which the probability estimates are the highest. This approach may help smooth results when the operational environmental states of any of the sensors 110, 118 are transitioning from one value to another. Averaging the temperature estimates over multiple successive measurements and/or running the output through a low-pass filter are other possible smoothing approaches. In any case, once the temperature estimate has been selected, the controller 112 may generate the temperature estimate and display it to the user on the display 104.

In some cases, during operation of the building control device 101, a user may request that the temperature in a room in which the building control device 101 and/or the sensors 110, 118 are located, be set to a specific temperature. Accordingly, the controller 112 may obtain a temperature estimate of the room in similar fashion as that described above. In some cases, the HVAC unit 124 or an onboard controller of the HVAC unit 124 may include a receiver and the transmitter 108 may communicate with the HVAC unit 124 through the receiver. The transmitter 108 may transmit signals to the HVAC unit 124 using any suitable wireless and/or wired communication protocol. In some cases, the transmitter 108 may use an ad-hoc wireless network. In other cases, the transmitter 108 may utilize a wireless mesh network and more particularly, a ZigBee wireless or other mesh network. If the transmitter 108 does utilize a mesh network, an onboard controller of the HVAC unit 124 may serve as the end node or nodes. In some cases, the transmitter 108 may utilize one or more wireless communication protocols including, but not limited to, cellular communication, ZigBee, REDLINK™, Bluetooth, Wi-Fi, IrDA, infra-red (IR), dedicated short range communication (DSRC), EnOcean, and/or any other suitable common or proprietary wireless protocol, as desired. As such, the controller 112 may send operational commands using the transmitter 108 to control the HVAC unit 124 to set the temperature of the room at the requested temperature. Additionally, the controller 112 may continuously obtain a current temperature estimate of the room, as described above, and adjust the operation of the HVAC unit 124 so that the temperature of the room is set and remains at the requested temperature.

In some cases, the I/O port 116 of the building control device 101 may permit the building control device 101 to communicate over one or more additional wired or wireless networks that may accommodate remote access and/or control of the building control device 101 via a remote device 122 such as, for example, a smart phone, tablet computer, laptop computer, personal computer, PDA, and/or the like. In some cases, the remote device 122 may provide a primary and/or a secondary user interface for the user to interact with the building control device 101. In some cases, the building control device 101 may utilize a wireless protocol to communicate with the remote device 122 over a network 120. In some cases, the network 120 may be a may be a Local Area Network (LAN) such as a Wi-Fi network or a Wide Area Network (WAN) such as the Internet. These are just some examples.

In some cases, the remote device 122 may execute an application program that facilitates communication and control of the building control device 101. The application program may be provided by and downloaded from an external web service (e.g., Apple Inc.'s ITUNES®, Google Inc.'s Google Play, a proprietary server, and so forth) for this purpose, but this is not required. In one example, the application program may cause the remote device 122 to receive and store data, such as operational environmental states at which the sensors operate, the JPD's of the sensors at each operational environmental state, a bias for each sensor, residual measurements, and so on, received from the building control device 101. The application program may translate the data received from the building control device 101 and display the data to the user via the user interface of the remote device 122. Additionally, the application program may be capable of accepting an input from a user through the user interface of the remote device 122 and transmitting accepted input to the building control device 101. For example, if the user inputs include requests to see the environmental conditions of a certain space or requests to set a specific environmental condition, the application program may transmit these requests to the building control device 101.

Figure 2:
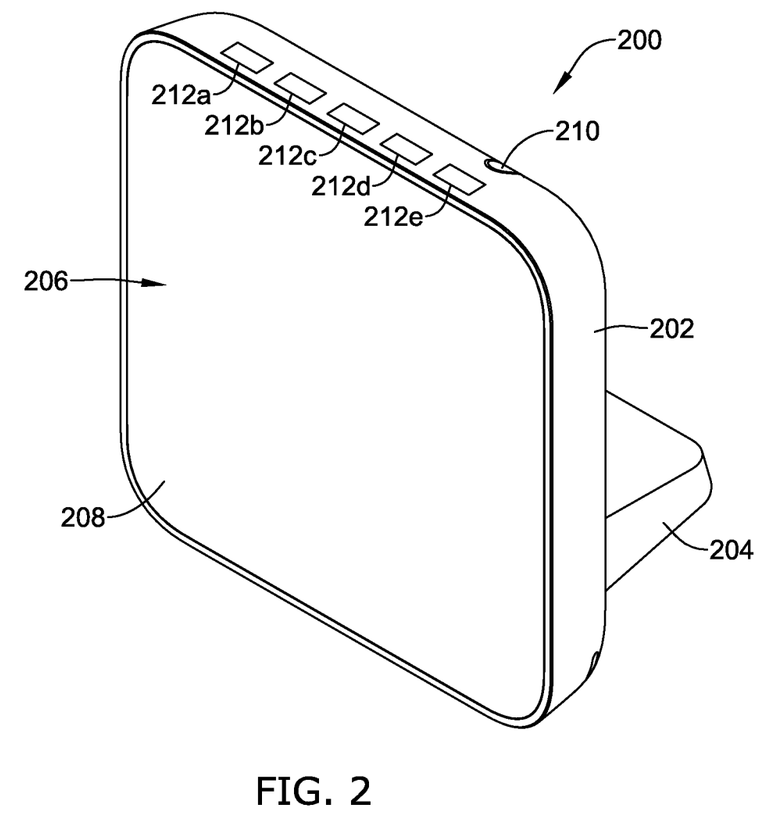
FIG. 2 is a schematic view of an illustrative building control device.

FIG. 2 is a perspective view of an illustrative building control device 200 that may be an example of the building control device 100 of FIG. 1. In some cases, the building control device 200 may be a thermostat that receives requests for environmental conditions, such as the temperature, and receives requests to set a specific environmental condition. In the example shown, the building control device 200 may include a housing 202 and an optional stand 204 or other standing feature to aid in placing the building control device 200 on a surface, such as on the surface of a table, desk, counter, or the like. Additionally and/or alternatively, in some cases, the building control device 200 may have a mounting feature to aid in mounting the building control device 200 to a wall or ceiling of a room in a building, house, or structure. If battery powered, the housing 202 may include a battery compartment for holding a battery or battery pack (not explicitly shown). The housing 202 may have any shape or size suitable for housing the internal electronics of the building control device 200.

The building control device 200 may include a user interface 206. In some cases, the user interface 206 may include a display 208. In some cases, the display 208 may include or may be an LCD, an OLED, or other display technology, and in some cases a fixed segment display, a dot matrix LCD display, a 7-segment type display, and/or may include one or more LEDs. In the example shown, the display 208 is a touch screen LCD panel that functions as both the display 208 and a keypad. In other cases, the user interface may have a physically distinct keypad. In addition, the housing 202 may include an opening or window 210 to aid in communicating with an HVAC unit and/or environmental sensors, such as microelectronic sensors. The opening or window 210 may extend at least partially around an outer perimeter of the housing 202. In some cases, the window or opening 210 may be located along the top of the building control device 200. In some cases, the window 210 may be transparent or semi-transparent to low energy signals (e.g., Bluetooth Low Energy (BLE)), and a low energy transmitter and/or receiver may be positioned just behind the window 210. The housing 202 may include a larger opening or window 210 than shown, or multiple windows 210, if desired.

In some cases, the building control device 200 may include environmental sensors 212A-212E. In some examples, one or more of the environmental sensors 212A-212E may be a microelectronic sensor, such as microelectromechanical sensor (MEMS). MEMS may be made up of components between 1 and 100 micrometers in size (i.e., 0.001 to 0.1 mm), and MEMS may range in size from 20 micrometers to a millimeter (i.e., 0.02 to 1.0 mm), although components arranged in arrays may be more than 1000 mm$^2$. MEMS or elements of MEMS may be manufactured and consist of materials such as silicon, polymers, metals (e.g., gold, nickel, aluminum, copper, chromium, titanium, tungsten, platinum, silver, and so on) ceramics (e.g., nitrides of silicon, aluminum, titanium, silicon carbide, and so on), for example. In some cases, the sensors 212A-212E may be located along the top of the building control device 200. In some cases, the sensors 212A-212E may be located at different locations of the building control device 200. For instance, the sensors 212A-212E may be partially or entirely around the housing 202. In some cases, the sensors 212A-212E may be located outside of the housing 202 and the building control device 200 may communicate and control the sensors 212A-212E remotely.

Figure 3:
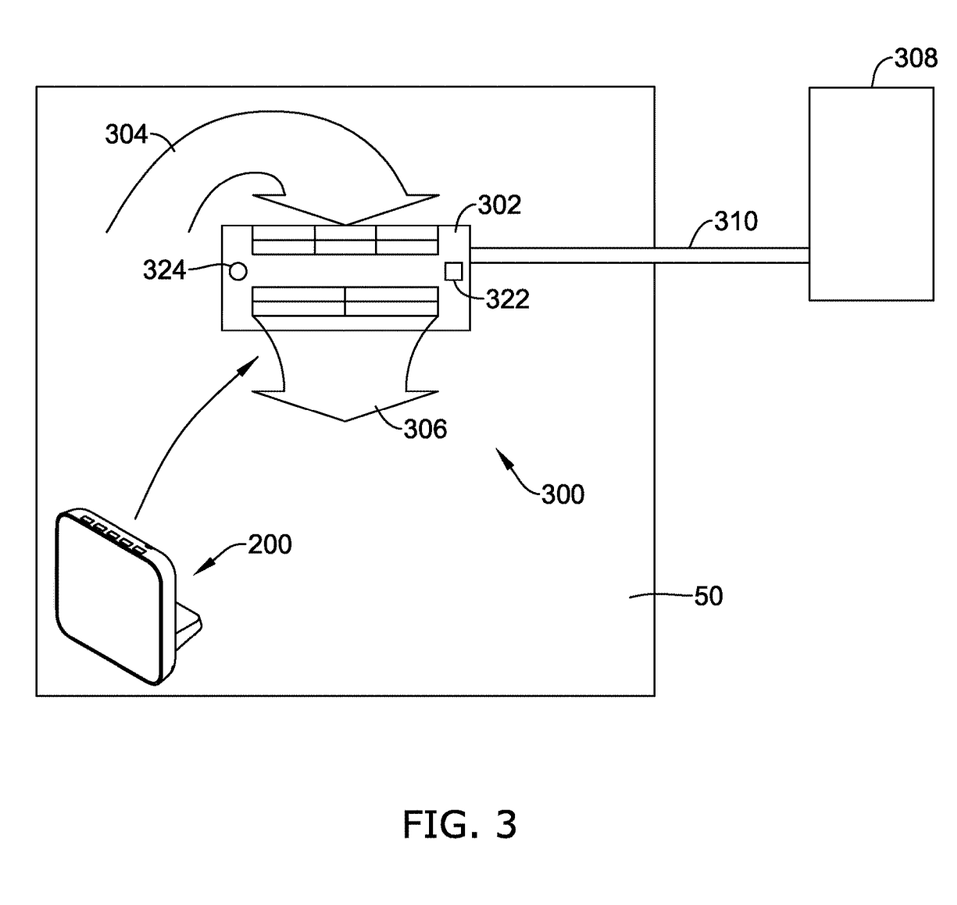
FIG. 3 depicts an illustrative approach of controlling an HVAC unit.

FIG. 3 depicts an illustrative approach of controlling an HVAC unit 300 using the building control device 200. In some cases, the HVAC unit 300 may thermostatically control a temperature of a space 50. In some cases, the goal of the approach, illustrated using FIG. 3, may be to establish and control the temperature of the space 50 at a temperature requested by a user. As such, the building control device 200 may be used to produce an accurate estimate of the reference temperature and adjust the operation of the HVAC unit 300 such that the requested temperature of the space 50 is achieved.

It is contemplated that the HVAC unit 300 may be a mini-split HVAC unit, a window air conditioning unit, a central air conditioning unit, a forced-air central heating unit, or any other suitable HVAC unit. Moreover, it is contemplated that various embodiments and examples described herein may be extended to other building control systems and/or units including, but not limited to, security system units, lighting system units, and so forth.

The illustrative HVAC unit 300 may include an indoor unit 302 that may be configured to draw in return air 304 and supply temperature regulated air 306 to the space 50. The indoor unit 302 may be configured to handle air 304 and 306 with or without a network of ductwork installed within and/or around the space 50.

The indoor unit 302 of the HVAC unit 300 may be connected to an outdoor unit 308, sometimes through a hole in an external wall of the building. In some cases, lines 310 can carry a working fluid that may be transferred between the indoor unit 302 and the outdoor unit 308. Outdoor unit 308 may be exposed to an outdoor space, although this is not necessary in all instances. In some cases, outdoor unit 308 may be mechanically connected to the indoor unit 302. The outdoor unit 308 may extend through a hole in an external wall of the building to access the outdoor space. Alternatively, the outdoor unit 308 may be located remote from the indoor unit 302 and may be operatively connected by lines 310 carrying a working fluid and/or by one or more ducts. In some cases, the HVAC unit 300 may have a cooling mode and/or a heating mode for controlling the temperature of air inside of the building. In some instances, such as when the HVAC unit is a mini-split HVAC system, the HVAC unit 300 may be mounted high in a room, toward the ceiling.

In some cases, the HVAC unit 300 may be in communication with the building control device 200, which may be located remotely from the HVAC unit 300. When so provided, the building control device 200 may be configured to communicate wirelessly with an onboard controller 322 of the HVAC unit 300, and the onboard controller 322 may be configured to accept input signals, from the remotely located building control device 200. In some instances, the building control device 200 may communicate with the onboard controller 322 of the HVAC unit 300 through any suitable communication path, such as via a wired (Ethernet, USB, RS-232, and so forth) and/or a wireless (Wi-Fi, Bluetooth, Zigbee, and so on) communication link. Communication between the building control device 200 and the onboard controller 322 of the HVAC unit 300 may be unidirectional (e.g., from the building control device 200 to HVAC unit 300) or bidirectional, as desired.

In some cases, the building control device 200 may have a preconfigured set of operational environmental states for the sensors 212A-212E locally or remotely stored in a memory 324. In some cases, the operational environmental states may be determined based on a finite number of conditions dependent on discretized values of temperature outside the housing 202 of the building control device 200, temperature of heat disturbances inside the housing 202 (combined with length of time since disturbance power last turned on or off,) direction and speed of directed airflow outside the housing, etc. For instance, an operational environmental state (i) may have as part of that state a range of space 50 temperatures $Z^i_{range} = [Z^i_{min}, Z^i_{max}]$.

In some cases, the set of operational environmental states may depend on the choice of calibration model and the desired calibration accuracy. For example, the calibration model may be an analytic equation involving the reference temperature outside the housing 202, a set of temperature measurements from different sensors 212A-212E inside the housing 202, a set of model parameters, and a residual error for each sensor 212A-212E. For each operational environmental state, a collection of reference temperatures consistent with that operational environmental state and associated sensor 212A-212E temperatures may be gathered. The range of reference temperatures for each state i should span the range $Z^i_{range}$. The model parameters for that state may then be computed to minimize the residual errors for each sensor.

In some examples, the calibration model may be: $X_{jk} = Z_k + \beta_j + \text{resid}_{jk}$. In this case, there may be M different operational environmental states in which the sensors might operate, indexed by i and a number K (e.g., K=1000) different calibration measurements may be obtained for each operational environmental state i. When the calibration of the building control device 200 is initially performed, it may be necessary to take measurements over a large number of operational environmental states. For example, there might be at least 10 ranges of reference temperatures, 5 different conditions for directed airflow outside the housing 202, and perhaps 20 discrete states for the thermal disturbance inside the housing 202 (depending on severity). As such, the initial calibration may require taking data for 1,000 or more different combinations of these variables (M≤1,000), and perhaps 1,000 different calibration measurements (K=1,000) for each of these combinations. From each set of calibration measurements, a set of calibration coefficients indexed by i (the environment state) and j (the sensor number) may be computed. In this example, these coefficients may be the bias numbers $\beta^i_j$. In some cases, the initial calibration procedure may be used to find regions in the space 50 where a fixed set of coefficients and their JPD's might be used that meet needed accuracy. In some cases, the calibration solutions and JPD's obtained for a few extreme operational environmental states may be interpolated to achieve adequate performance for intermediate states. In some instances, the number of operational environmental states used in the calibration of the building control device 200 may be a trade between calibration expense and accuracy.

In some cases, the input may incorporate sensor data, nominal bin fraction data, parameters dt (to scale a gradient step size), maxit (a maximum number of iterations for the gradient search), and error_tol (used in a convergence test for the gradient search). The sensor data for each environment state i may consist of, for k=1, . . . ,K, measurements range $Z^i_k$ of reference temperature and $X^i_{jk}$ of temperatures from sensor j inside the housing 202. For each k, the value $Z^i_k$ may be taken inside the range of temperatures consistent with state i. The nominal bin fraction data ($f^i_{j,lj}$) for the operational environmental states i and sensors j (i.e., sensors 212A-212E). The values of lj in this example may run from 1 to 5, since there are five sensors 212A-212E. However, the example depicted in FIG. 3 may be applied for any number >2 of lj. The value $f^i_{j,lj}$ may be the fraction of the residual measurement errors in state i that nominally go into bin lj in the discretized marginal probability distribution for sensor j. The bin $l_1$ may be associated with the smallest (most negative) errors, and the bin $l_5$ may be associated with the largest errors. For example, the values for $f_{j,lj}$ may be (same for all j): $f_{j,1}=0.05$, $f_{j,2}=0.10$, $f_{j,3}=0.70$, $f_{j,4}=0.10$, $f_{j,5}=0.05$. In this case, 70% of the errors are in the middle bin (errors with smallest magnitudes), while 5% are in each extreme bin. In any case, $f_{j,lj}>0$ for all j, $l_j$ and $\Sigma_{lj}f_{j,lj}=1$. For each j, the residuals in $R_j$ may be ordered by size and values grid_$\text{mat}_{1,j}$ ... grid_$\text{mat}_{6,j}$ may be picked so that the fractions of residuals between successive grid_mat values match the assumed values $f_{j,lj}$. Once this is done, the bin $l_j$ sensor j may be defined by: $\text{resid}_{jk} \ominus \text{bin } l_j \Leftrightarrow \text{grid\_mat}_{lj,j} \leq \text{resid}_{jk} \leq \text{grid\_mat}_{lj+1,j}$. In some cases, there may be some flexibility in how to pick the values of grid_mat. In some cases, a baseline selection may be used to choose the highest and lowest residuals at the extreme ends (i.e., grid_$\text{mat}_{1,j}=\min(\text{resid}_{jk})$, grid_$\text{mat}_{6,j}=\max(\text{resid}_{jk})$) and choose the midpoint between boundary residuals in between. In another case, the multiple residual errors may be exactly equal at a nominal boundary between bins. In either case, several of the values $f_{j,lj}$ may be slightly modified so that the fractions of K may be integers and midpoints between boundary residuals separating the bins. In this case, the modified values of the $f_{j,lj}$ may be used to create grid_mat.

In some cases, a set of residual errors (with respect to the calibration model) for each sensor 212A-212E may be computed and fitted into a histogram. In this example, there are five sensors 212A-212E, indexed by j=1, . . . ,5, in the housing 202. For all j, the histogram for sensor j has 5 bins, indexed by lj=1, . . . ,5. In some cases, the JPD (also called the π tensor) may be computed for the set of residual errors. In this example, the JPD may take an $\pi_{j1 \ldots j5}$=probability that the residual error of sensor j lies in bin lj for all j=1, . . . ,5, and all lj=1, . . . ,5. For instance, the residual error may include $p_jl_j$=probability that the residual error for sensor j lies in bin lj, and $q_{j1,j2,j3,j4,j5}$=probability that the residual error for sensor $j_1$ lies in bin $lj_1$ and the residual error for sensor $j_2$ lies in bin $lj_2$. In some cases, $p_j, l_j$ may be called the p tensor and $q_{j1,j2,j3,j4,j5}$ may be called the q tensor. The p tensor may have 5×5=25 components. By convention, the q tensor may be defined only for $j_1<j_2$, so in this example, the q tensor may have 10×5×5=250 components.

In some cases, the values for a p_target and a q_target may be computed. These values may characterize the conditions that may be satisfied by the JPD (π) to be consistent with the calibration data $Z_k$ and $X_k$. Using the $f_{j,lj}$ and grid_mat values the p_target may be defined as p_target$_{j,lj}=f_{j,lj}$ and using the sets $Q_{j1,j2}=(\text{resid}_{j1,k}, \text{resid}_{j2,k})$, the q_target may be computed by q_target$_{j1,j2,lj1,lj2}$=Fraction of points in $Q_{j1,j2}$ where $\text{resid}_{j1,k} \in \text{bin } l_{j1}$ and $\text{resid}_{j2,k} \in \text{bin}_{j2}$. In this example, p_target$_{j,lj}$ may have 25 components, one for each pair of indices j and $l_j$ from 1 to 5. On the other hand, the tensor q_target$_{j1,j2,lj1,lj2}$ may only be assigned values $1 \leq j_1 \leq j_1+1 \leq j_2 \leq 5$. For $j_1, j_2$ satisfying these inequalities, there may be values of μ assigned for each pair $l_{j1}, l_{j2}$ of indices from 1 to 5. So there may be 25 components for p_target and 250 components for q_target.

In some cases, a target_pq_vector may be computed from the tensors p_target and q_target as follows. The first 25 coordinates of target_pq_vector may be target_pq_vector (ind1l(j, $l_j$))=p_target$_{j,lj}$, where ind1(j, $l_j$)=5*(j-1)+$l_j$, while the last 250 coordinates may be target_pq_vector(25+ind2 $(j_1,j_2,l_{j1},l_{j2})$=q_target$_{j1,j2,lj1,lj2}$, where ind2$(j_1,j_2,l_{j1},l_{j2})=25*((j_2-2)+(j_2-1)(8-j_1)/2)+\text{ind1}(l_{j1}, l_{j2})$. The vector target_pq_vector may be the target for the gradient search, but by its construction this vector may lie in a subspace of the 275-dimensional space. To perform the gradient search, a 100-by-275 matrix ker_mat may be needed, the kernel of which may define the subspace where a valid target_pq_vector may reside. By construction, the target_pq_vector may have, as its coordinates, the values $p\_target_{j,lj}$ and $q\_target_{j1,j2,lj1,lj2}$. One relation among these values may be satisfied, for each $1_1$ and for all $j_2 > 1$, $p\_target_{1,l1} = \Sigma_{lj2} q\_target_{1,j2,l1,lj2}$. In the above set of equations, there may be 5 different values for $1_1$ and 4 different values of $j_2 > 1$, so there may be 20 different linear equations in all. These equations may be satisfied because every residual for sensor $j_2$ may lie in exactly 1 of the 5 bins $l_{j2} = 1, \ldots, 5$, so the sum on the RHS may equal the expression on the LHS by construction. In the above, $j_i = 1$ was arbitrarily fixed and 20 different equations were obtained. By fixing one of the j-indices at the other 4 values 2,3,4,5 and letting the other j-index roam over the remaining 4, 20 more equations may obtained in each case. As a result, a 100 by 275 matrix ker_mat may be generated that annihilates any valid target_pq_ vector.

As stated above, components of the JPD ($\pi_{l1,\ldots,l5}$)=probability that the residual error of sensor j lies in bin $l_j$ for all $j=1, \ldots, 5$, and all $l_j = 1, \ldots, 5$. As such, the components of $\pi$ may be satisfied for all $l_1, \ldots l_5$, $\pi_{l1,\ldots,l5} \geq 0$, and $1 = \Sigma_{l1,\ldots,l5} \pi_{l1,\ldots,l5}$. From these two equations, it may be seen that the values $\pi_{l1,\ldots,l5}$ for $\{l_1, \ldots l_5\}$ can be viewed as the components of a probability distribution on the multidimensional histogram of sensor residual errors. This may produce the form of the JPD. In this case of the JPD, the entropy S may be $S = -\Sigma_{m1,\ldots,mN} \pi_{m1,\ldots,mN} \log(\pi_{m1,\ldots,mN})$, where for x=0 we define $x \log(x)=0$.

In some cases, a maximum-entropy JPD may be a JPD that maximizes the entropy function S subject to the constraint that the JPD may be consistent with the conditions that $p_j$, $l_j$ are the single-sensor residual error probabilities and $q_{j1,j2,lj1,lj2}$ are the pairwise-sensor residual error probabilities. These consistency conditions may be satisfied when $p_{j,lj} = \Sigma_{k1,\ldots,k5} \delta(k_j-l_j) \pi_{k1,\ldots,k5}$ and $p_{j1,j2,lj1,lj2} = \Sigma_{k1,\ldots,k5} \delta(k_{j1}-l_{j1}) \delta(k_{j2}-l_{j2}) \pi_{k1,\ldots,k5}$. In some cases, a computational procedure may be used for finding the JPD $\pi_{m1,\ldots,mN}$ that maximizes the function S in equation $S = -\Sigma_{m1,\ldots,mN} \pi_{m1,\ldots,mN} \log(\pi_{m1,\ldots,mN})$, subject to the constraints $l_1, \ldots l_5$, $\pi_{l1,\ldots,l5} \geq 0$, and $1 = \Sigma_{l1,\ldots,l5} \pi_{l1,\ldots,l5}$ along with $p_j$, $l_j = \Sigma_{k1,\ldots,k5} \delta(k_j-l_j) \pi_{k1,\ldots,k5}$ and $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$. In some examples, S may be maximized by using the approach of Lagrange multipliers, such as using $\lambda_{j,lj}$ (25 of these in this example) and $q_{j1,j2,lj1,lj2}$ (250 of these in this example) associated with the constraint equations $p_j$, $l_j = \Sigma_{k1,\ldots,k5} \delta(k_j-l_j) \pi_{k1,\ldots,k5}$ and $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$, respectively. Applying the standard Lagrange multiplier calculations, an analytic formula $\pi_{l1,\ldots,l5} = e^{\kappa + \Sigma_j \lambda_{j,lj} + \Sigma_{j1,j2,\mu2lj1,lj2}}$ where $\kappa$ is chosen so that equation $1 = \Sigma_{l1,\ldots,l5} \pi_{l1,\ldots,l5}$ may be satisfied. This last condition for $\kappa$ makes it a function of $\lambda$ and $\mu$. In some cases, values of $\{\lambda, \mu\}$ may now be found so that the $\pi_{l1,\ldots,l5}$ in equation $\pi_{l1,\ldots,l5} = e^{\kappa + \Sigma_j \lambda_{j,lj} + \Sigma_{j1,j2,\mu2lj1,lj2}}$ may satisfy equations $1 = \Sigma_{l1,\ldots,l5} \pi_{l1,\ldots,l5}$, $p_j$, $l_j = \Sigma_{k1,\ldots,k5} \delta(k_j-l_j) \pi_{k1,\ldots,k5}$ and $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$. For such a solution, the inequalities in $l_1, \ldots l_4$, $\pi_{l1,\ldots,l5} \geq 0$ may be satisfied by construction because the right-hand-side of equation $\pi_{l1,\ldots,l5} = e^{\kappa + \Sigma_j \lambda_{j,lj} + \Sigma_{j1,j2,\mu2lj1,lj2}}$ may be positive for all $l_1, \ldots l_5$.

It may be seen from equations $p_{j,lj} = \Sigma_{k1,\ldots,k5} \delta(k_j-l_j) \pi_{k1,\ldots,k5}$ and $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$ and $\pi_{l1,\ldots,l5} = e^{\kappa + \Sigma_j \lambda_{j,lj} + \Sigma_{j1,j2,\mu2lj1,lj2}}$ and that the tensors p and q may be analytical functions of the tensors $\lambda$ and $\mu$. In some cases, the particular pair of tensors $\lambda, \mu$ such that p=p_target and q=q_target may need to be found. To do this, in some instances, a gradient search in the space of $\lambda$ and $\mu$ may be performed. To initialize the tensors $\lambda$ and $\mu$ an updated $f_{j,lj}$ for each j and $l_j = 1, \ldots, 5$ may be used. For all j and $l_j$ the initial values of the tensors $\lambda$ and $\mu$ may be $\lambda_{j,lj} = \log(f_{j,lj})$, $\mu_{j1,j2,lj1,lj2} = 0$. While $\mu_{j,lj}$ may have values for all pairs of indices from 1 to 5, the tensor components $\mu_{j1,j2,lj1,lj2}$ may have values only for $1 \leq j_1 \leq 4$, $j_1 \leq 1 \leq j_2 \leq 5$. For $j_1$, $j_2$ satisfying these inequalities there may be values of $\mu$ $j_1$, $j_2$ assigned for each pair $l_{j1}$, $l_{j2}$ of indices from 1 to 5. So there may be 25 components for $\lambda$ and 250 components for $\mu$. In the gradient search, a vectorized version of the tensors $\lambda$ and $\mu$ may be used. Associated with the tensors $\lambda$ and $\mu$ may be the vector current_$\lambda\mu$_vector of length 275. The first 25 coordinates of this vector may be the components of the tensor $\lambda$ arranged as follows: current_$\lambda\mu$_vector(ind1(j, $l_j$))=$\lambda_{j,lj}$, where ind1(j, $l_j$)=5*(j-1)+$l_j$. The last 250 coordinates may be: current_$\lambda\mu$_vector(25+ind2($j_1,j_2,l_{j1},l_{j2}$))= $\mu_{j1,j2,lj1,lj2}$, where ind2($j_1,j_2,l_{j1},l_{j2}$))=25*(($j_2$-2)+($j_1$-2)(8-$j_1$)2)+ind1($l_{j1},l_{j2}$).

In some cases, the initial value of $\pi$ tensor may be the product: $\pi_{l1,\ldots,l5} = (f_{1,l1})(f_{2,l2})(f_{3,l3})(f_{4,l4})(f_{5,l5})$. The values of p, q, r, and s may then be computed as functions of the components of the $\pi$ tensor. These 4 tensors may be initialized such that p may be a tensor with 25 components $p_{j,lj}$, q may be a tensor with 250 components $q_{j1,j2,lj1,lj2}$, r may be a tensor with 1,250 components $r_{j1,j2,j3,lj1,lj2,lj3}$, and s may be a tensor with 3,125 components $s_{j1,j2,j3,j4,lj1,lj2,lj3,lj4}$. The p, q, r and s tensors may then be initialized from the $\pi$ tensor as follows: $p_{j,lj} = \Sigma_{k1,\ldots,k5} \delta(k_j-l_j) \pi_{k1,\ldots,k5}$, $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$, $r_{j1,j2,j3,lj1,lj2,lj3} = \Sigma_{k1,\ldots,k5} \delta(k_{j1}-l_{j1}) \delta(k_{j2}-l_{j2}) \delta(k_{j3}-l_{j3}) \pi_{k1,\ldots,k5}$ and $s_{j1,j2,j3,j4,lj1,lj2,lj3,lj4} = \Sigma_{k1,\ldots,k5} \delta(k_{j1}-l_{j1}) \delta(k_{j2}-l_{j2}) \delta(k_{j3}-l_{j3}) (\delta k_{j4}-l_{j4}) \pi_{k1,\ldots,k5}$. In some cases, the current_pq_vector may be computed as a function of p and q after those tensors are updated. In some instances, the value of current_pq_vector may be initialized such that the first 25 coordinates of current_pq_ vector may be: current_pq_vector(ind1(j, $l_j$))=$p_{j,lj}$, while the last 250 coordinates may be: current_pq_vector(2 +ind2($j_1,j_2,l_{j1},l_{j2}$))=$q_{j1,j2,lj1,lj2}$.

In some cases, an error_vector may be initialized and stored in a diagnostics_mat matrix. Initialization may be achieved by setting the error_vector=target_pq_vector−curren_t pq_vector, diagnostics_mat=275 by maxit+1 matrix of zeros, and diagnostics_mat(1:275,1)=error_vector. The value of k may be initialized with k=0. The value of k may be incremented by 1. The Jacobian matrix may also be computed. In some cases, the Jacobian may be a matrix of partial derivatives of the coordinates of current_ pq_ vector with respect to the variables in current_$\lambda\mu$_vector. In some cases, the partial derivatives may be computed using the following equations: (a) $p_{j,lj} = \Sigma_{k1,\ldots,k5} \delta(k_j-l_j) \pi_{k1,\ldots,k5}$ and $q_{j1,j2,lj1,lj2} = \Sigma_{k1,\ldots,k5} \delta(k_{j1}-l_{j1}) \delta(k_{j2}-l_{j2}) \pi_{k1,\ldots,k5}$ which show p and q as functions of $\pi$, (b) $\pi_{l1,\ldots,l5} = e^{\kappa + \Sigma_j \lambda_{j,lj} + \Sigma_{j1,j2,\mu2lj1,lj2}}$ which shows $\pi$ as a function of $\kappa$, $\lambda$ and $\mu$, (c) unscaled $\pi_{l1,\ldots,l5} = e^{\kappa + \Sigma_j \lambda_{j,lj} + \Sigma_{j1,j2,lj1,lj2}}$, scale_factor=$\Sigma l_1, \ldots l_5$ unscaled_$\pi_{l1,\ldots,l5}$, $\eta = -\log$(scale_factor) which shows $\kappa$ as a function of $\lambda$ and $\mu$. Combining all these equations, each component of p and q may have a multiplicative factor of $e^\kappa$ and can be written in the form $e^\kappa U(\lambda,\mu)$ where $U(\lambda,\mu)$ may be a sum of unscaled $\pi$ tensors. Then for each of the p and q components, the partial derivatives with respect to $\lambda$ and $\eta$ may be computed using the product formula as the sum of two terms: $\partial e^\kappa(\lambda,\mu)/\partial x = e^\kappa \partial U(\lambda,\mu)/\partial x + (\partial \kappa e^\kappa/\partial x) e^\kappa U(\lambda,\mu)$ where x may be any component of $\lambda$ or $\mu$.

In some cases, the formula for the jacobian may be the sum of two matrices. The first matrix corresponding to $e^\kappa \partial U(\lambda,\mu)/\partial x$ and the second matrix corresponding to $(\partial \kappa e^\kappa/\partial x) e^\kappa U(\lambda,\mu)$ in equation $\partial e^\kappa(\lambda,\mu)/\partial x = e^\kappa \partial U(\lambda,\mu)/\partial x + (\partial \kappa e^\kappa/\partial x) e^\kappa U(\lambda,\mu)$. In some examples, the first matrix may be written in the form:

$$\begin{bmatrix} A & B \\ C & D \end{bmatrix},$$

where A may be a 25 by 25 matrix, B may be a 25 by 250 matrix, C may be a 250 by 25 matrix, and D may be a 250 by 250 matrix. The entries of A may come from $\partial p_{j1,lj1}/\partial \lambda_{j2,lj2}$, the entries of B may come from $\partial p_{j1,lj1}/\partial \mu_{j2,j3,lj2,lj3}$, the entries of C may come from $\partial q_{j1,j2,lj1,lj2}/\partial \lambda_{j3,lj3}$, and the entries of D may come from $\partial q_{j1,j2,lj1,lj2}/\partial \mu_{j3,j4,lj3,lj4}$. In A, B, C and D, only those terms from these expressions may be kept that do not involve the partial derivatives of κ (i.e., the first terms on RHS of $\partial e^{\kappa}(\lambda,\mu)/\partial x = e^{\kappa} \partial U(\lambda,\mu)/\partial x + (\partial \kappa e^{\kappa}/\partial x) e^{\kappa}$). The formulae for these terms may depend on the set of distinct values of indices $j_1, j_2, j_3, j_4, l_1, l_2, l_3, l_4$ that appear in either the numerator or denominator of each expression.

For a particular expression, let $S_j$ be the set of distinct j-index values. In some cases, $S_j$ may contain 1, 2, 3 or 4 values depending on the choice of partial derivative. If there is one value, it may be denoted by a, if there are two values, they may be denoted by a and b, if there are three values, they may be denoted a, b, and c, and if there are four values, they may be denoted a, b, c, and d in order of ascending value. Also, $l_1, l_b, l_c, l_d$ may be the corresponding l-values. Then the values of the expressions in A, B, C and D may be: For $\partial p_{j1,lj1}/\partial \lambda_{j2,lj2}$, if $j_1 = j_2$ the value may be $\delta(l_{j2}-l_{j1})p_{j1,lj1}$, otherwise the value may be $q_{a,b,la,lb}$. For $\partial p_{j1,lj1}/\partial \mu_{j2,j3,lj2,lj3}$, if $j_1 = j_2$ the value may be $\delta(l_{j2}-l_{j1})q_{a,b,la,lb}$, if $j_2 = j_3$ the value is $\delta(l_{j3}-l_{j1})q_{a,b,la,lb}$, otherwise the value may be $r_{a,b,c,la,lb,lc}$. For $\partial q_{j1,j2,lj1,lj2}/\partial \lambda_{j3,lj3}$, if $j_3 = j_2$ the value may be $\delta(l_{j2}-l_{j3})q_{a,b,la,lb}$, if $j_2 = j_3$ the value may be $\delta(l_{j3}-l_{j2})q_{a,b,la,lb}$, otherwise the value may be $r_{a,b,c,la,lb,lc}$. For $\partial q_{j1,j2,lj1,lj2}/\partial \mu_{j3,j4,lj3,lj4}$, if $[j_1, j_2] = [j_3, j_4]$ the value is $\delta(l_{j3}-l_{j1})\delta(l_{j3}-l_{j1})q_{a,b,la,lb}$, else if there are only 3 distinct j-index values the value may be $\delta(1'-1) r_{a,b,c,la,lb,lc}$ for 1' and 1 the 1-values for the repeated j index, else the value may be $s_{a,b,c,d,la,lb,lc,ld}$.

In some cases, to construct the second matrix, p_vec may be the 25-vector that is the top of current_pq_vector, and q_vec may be the 250-vector that is the bottom. Similarly, λ_vec may be the 25-vector at the top of current_λμ_vector and μ_vec may be the 250-vector at the bottom. Accordingly: $\partial \kappa/\partial \lambda\_vec = -p\_vec$, $\partial \kappa/\partial \mu\_ = -q\_vec$. The second matrix may then have the form:

$$\begin{bmatrix} -p_{vec}p_{vec}^T & -p_{vec}q_{vec}^T \\ -q_{vec}p_{vec}^T & -q_{vec}q_{vec}^T \end{bmatrix}.$$

The formula for the Jacobian matrix may then be:

$$\text{Jacobian} = \begin{bmatrix} A & B \\ C & D \end{bmatrix} + \begin{bmatrix} -p_{vec}p_{vec}^T & -p_{vec}q_{vec}^T \\ -q_{vec}p_{vec}^T & -q_{vec}q_{vec}^T \end{bmatrix}.$$

In some instances, the value of error_vector that was previously initialized, may be in updated each loop and used to compute grad_step to update the current_μλ_vector. The Jacobian matrix may be singular, but its kernel may be spanned by the rows of the 100 by 275 matrix ker_mat. Appending the matrix ker_mat to the bottom of the Jacobian matrix may create the full-rank 375 by 275 matrix big jac. Also, a 100-vector of zeros may be added to the bottom of the error_vector to get big_ev. Then the desired gradient step grad_step may be computed by solving the overdetermined linear system: grad_step=Lin_solve(big_jac, big_ev* dt) where Lin_solve(Y,Z) may be a robust linear equation solver for a square, full-rank matrix Y and vector Z that returns the vector X such that YX=Z. The curren_λμ_vector may then be updated accordingly: current_λμ_vector=current_λμ_vector+grad_step. The new values of λ and μ from may then be used to update the π tensor. First, an unscaled_π tensor may be computed: unscaled_$\pi_{l1,\ldots l5}$=$e^{\Sigma j, \lambda j, lj + \Sigma j1, j2, lj1, lj2}$. Then the scale_factor may be computed: scale_factor=$\Sigma l_1, \ldots, l_5$ unscaled_$\pi_{l1,\ldots l5}$. Then the new value of the π tensor may be computed: unscaled_$\pi_{l1,\ldots l5}$/scale_factor. By construction, the components of the new π tensor may be positive and sum to 1. Furthermore, by setting κ=−log(scale_factor), $\pi_{l1,\ldots l5}$=$e^{\Sigma j, \lambda j, lj + \Sigma j1, j2, lj1, lj2}$. From this equation and formulas $p_{j,lj}=\Sigma_{k1,\ldots k5}\delta(k_j-l_j)\pi_{k1,\ldots k5}$, $q_{j1,j2,lj1,lj2}=\Sigma_{k1,\ldots k5}\delta(k_{j1}-l_{j1})\delta(k_{j2}-l_{j2})\pi_{k1,\ldots k5}$, $r_{j1,j2,j3,lj1,lj2,lj3}=\Sigma_{k1,\ldots k5}\delta(k_{j1}-l_{j1})\delta(k_{j2}-l_{j2})\delta(k_{j3}-l_{j3})\pi_{k1,\ldots k5}$, and $s_{j1,j2,j3,j4,lj1,lj2,lj3,lj4}=\Sigma_{k1,\ldots k5}\delta(k_{j1}-l_{j1})\delta(k_{j2}-l_{j2})\delta(k_{j3}-l_{j3})(\delta k_{j4}-l_{j4})\pi_{k1,\ldots k5}$. for p,q,r,s, the expressions: $\partial p_{j1,lj1}/\partial \lambda_{j2,lj2}$, if $j_1=j_2$ the value may be $\delta(l_{j2}-l_{j1}) p_{j1}, l_{j1}$, otherwise the value may be $q_{a,b,la,lb}$, $\partial p_{j1,lj1}/\partial \mu_{j2,j3,lj2,lj3}$, if $j_1=j_2$ the value may be $\delta(l_{j2}-l_{j1}) q_{a,b,la,lb}$, if $j_1=j_3$ the value is $\delta(l_{j3}-l_{j1})q_{a,b,la,lb}$, otherwise the value may be $r_{a,b,c,la,lb,lc}$, $\partial q_{j1,j2,lj1,lj2}/\partial \lambda_{j3,lj3}$, if $j_3=j_2$ the value may be $\delta(l_{j2}-l_{j3})q_{a,b,la,lb}$, if $j_2=j_e$ the value may be $\delta(l_{j3}-l_{j1})q_{a,b,la,lb}$, otherwise the value may be $r_{a,b,c,la,lb,lc}$ and $\partial q_{j1,j2,lj1,lj2}/\partial \mu_{j3,j4,lj3,lj4}$, if $[j_1, j_2]=[j_3, j_4]$ the value is $\delta(l_{j3}-l_{j1})\delta(l_{j3}-l_{j1})q_{a,b,la,lb}$, else if there are only 3 distinct j-index values the value may be $\delta(1'-1) r_{a,b,c,la,lb,lc}$ for 1' and 1 the 1-values for the repeated j index, else the value may be $s_{a,b,c,d,la,lb,lc,ld}$ may be readily derived. As such, formulas $pp_{j,lj}=\Sigma_{k1,\ldots k5}\delta(k_j-l_j)\pi_{k1,\ldots k5}$, $q_{j1,j2,lj1,lj2}=\Sigma_{k1,\ldots k5}\delta(k_{j1}-l_{j1})\delta(k_{j2}-l_{j2})\pi_{k1,\ldots k5}$, $r_{j1,j2,j3,lj1,lj2,lj3}=\Sigma_{k1,\ldots k5}\delta(k_{j1}-l_{j1})\delta(k_{j2}-l_{j2})\delta(k_{j3}-l_{j3})\pi_{k1,\ldots k5}$, and $s_{j1,j2,j3,j4,lj1,lj2,lj3,lj4}=\Sigma_{k1,\ldots k5}\delta(k_{j1}-l_{j1})\delta(k_{j2}-l_{j2})\delta(k_{j3}-l_{j3})(\delta k_{j4}-l_{j4})\pi_{k1,\ldots k5}$ may be used to compute new values for p,q,r,s as functions of the new π tensor. Formulas current_pq_vector(ind1(j, $l_j$))=$p_j$, $l_j$ and current_pq_vector(25+ind2($j_1, j_2, l_{j1}, l_{j2}$))=$q_{j1,j2,lj1,lj2}$ may be used to compute the new value of current_ pq_ vector. Formulas error_vector=target_vector−current_pq_vector and diagnostics_mat(1:275, k+1)=error_vector may then be used to an update error_vector and diagnostics_mat. max_abs_error=max may then be used to see if the iteration has converged. In some cases, if max_abs_error<error_tol, the iteration may have converged and the values of π, β and grid_mat may be stored for the index i. Otherwise, if k<maxit then continue the iteration. If not, then the iteration has not converged. In some instances, if the value of 1 (the operational environmental state) is the last one (i.e., i=M), the values of π, β and grid_mat may have been found for all of the operational environmental states. However, if that is not the last operational environmental state, the values of π, β, and grid_mat may be found for the remaining operational environmental states.

In some cases, a user may then request that the temperature of the space 50 be set to a specific temperature. The building control device 200 may then start by looking at the $Z^i_{range}=[Z^i_{min}, Z^i_{max}]$ and using $X_{jk}=Z_k+\beta_j+resid_{jk}+$the temperature measurements from the sensors 212A-212E {$temp_j$}+coefficients {$\beta_j$} and consider the resulting line segment in the 5-dimensional space of sensor error residuals. The building control device 200 may then determine all the multibins $l_1, \ldots l_5$ intersected by this line segment by checking the systems of linear inequalities associated with {grid_mat$^i_{j,l}$}. In some cases, if no multibins are intersected, a dummy character may be placed in the value of $t_i$ and prob$_i$ may be set to 0. Otherwise, $\pi^i_{l1,\ldots l5}$ may be used to determine which of the intersected multibins has the highest probability. In some instances, the building control device 200 may place $t_i$=Z and value mapped to the midpoint of the residual line intersection with the highest-probability multibin. The building control device 200 may then place $prob_i$=the highest probability value. In some cases, there may be a list of pairs for each i, of values [$t_i$, $prob_i$]. The building control device 200 may then use several different approaches to select a value for ref_t_est=temperature estimate, from the list. One way is to select the value $t_i$ for which $prob_i$ is the highest (i.e., the Maximum Likelihood Estimation (MLE)). Another is to interpolate between the two $t_i$'s that have the highest values of $prob_i$. In still other cases, averaging over multiple times or passing the signal through a low-pass filter are two other ways to smooth the output value of ref_t_est.

In any case, once the building control device 200 has determined the temperature estimate, the building control device 200 may send operational commands to control the HVAC unit 300 to set the temperature of the space 50 at the requested temperature. Additionally, the building control device 200 may continuously obtain a current temperature estimate of the space 50, as described above, and adjust the operation of the HVAC unit 300 so that the temperature of the space 50 is set and remains at the requested temperature.

Figure 4:
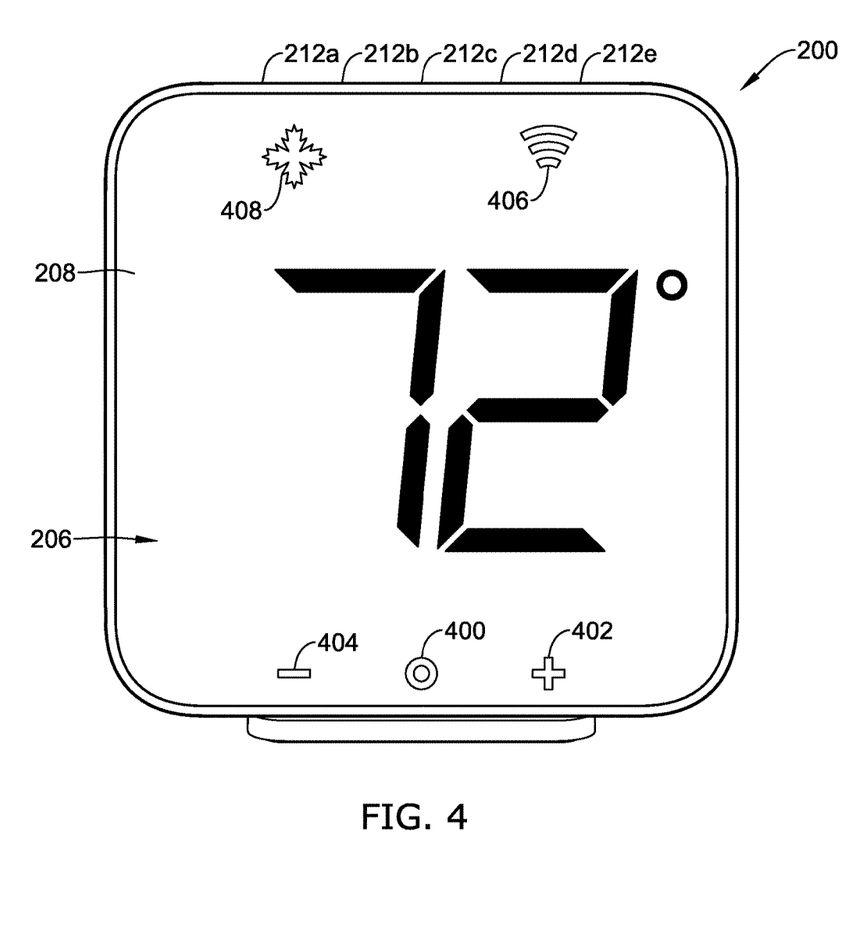
FIG. 4 depicts an illustrative approach of providing environmental conditions of a space using the building control device.

FIG. 4 depicts an illustrative approach of providing environmental conditions of a space using the building control device. As shown, the building control device 200 includes the user interface 206 having the touch screen display 208. In some cases, the user interface 206 may include a component 400 for a user to request that a current environmental condition of the space be displayed on the display 208. In some cases, the user interface 206 may also include components 402 and 404 for the user to change the current environmental condition of the space. In some cases, the user interface 206 may also include an audio component 406 such that a user may request the current environmental conditions of the space and change the current environmental condition of the space using audio signals (e.g., by speaking to the building control device 200). In some cases, the user interface 206 may further include a component 408 for the user to change the environmental condition or conditions displayed on the display 208 (e.g., temperature, humidity, and so on).

In some cases, a user may request the current temperature to be displayed on the display by pressing the component 400. Accordingly, the building control device 200 may obtain a current temperature estimate for the space using the sensors 212A-212E, similar to the approach discussed above in regard to FIG. 3. Once the building control device 200 has determined the temperature estimate, the building control device 200 may display the temperature estimate for the space, in this case 72 degrees F., to the user on the display 208.

Figure 5:
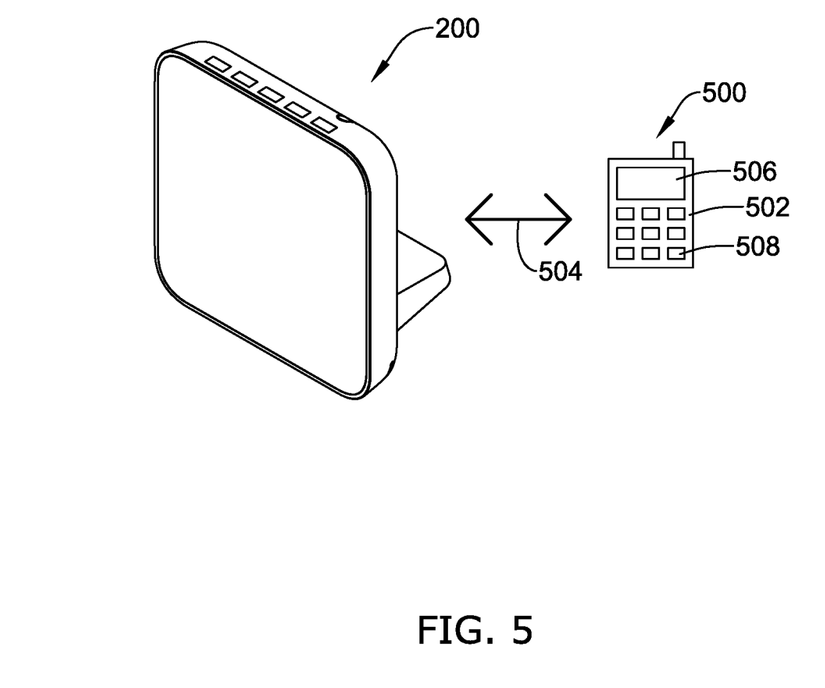
FIG. 5 depicts an illustrative approach of providing environmental conditions of a space using the building control device and a remote device.

FIG. 5 depicts an illustrative approach of providing environmental conditions of a space using the building control device 200 and a remote device 500. According to certain embodiments, the remote device 500 may include a user interface 502. In some cases, the remote device 500 may provide a primary and/or a secondary user interface for the user to interact with the building control device 200. In some cases, the user interface 502 may permit the remote device 500 to display and/or solicit information, such as desired environmental conditions (e.g., temperature settings, humidity settings, and so on), security settings, lighting settings, from a user, as well as accept one or more user interactions with the remote device 500. Through the user interface 502, the user may, for example, view and manage the building control device 200. In some cases, the building control device 200 may utilize a wireless protocol to communicate with the remote device 500 over a network 504. In some cases, the network 504 may be a may be a Local Area Network (LAN) such as a Wi-Fi network or a Wide Area Network (WAN) such as the Internet. These are just some examples. In some cases, the remote device 500 may be a smart phone, a tablet computer, a laptop computer, a desktop computer and/or any other suitable device, and the user interface 502 may be a physical user interface that may include a display 506 and/or a distinct keypad 508. The display 506 may be any suitable display. In some instances, the display 506 may include or may be a liquid crystal display (LCD), an OLED, and/or other display technologies, and in some cases a fixed segment display, a dot matrix LCD display, a 7-segment type display, and/or may include one or more LEDs. In some cases, the display 506 may include a touch screen LCD panel that functions as both the display 506 and the keypad 508. In some cases, the user interface 502 may be adapted to solicit network credentials, but this is not required.

In some cases, a user may use the remote device 500 to request the current temperature of a space. Accordingly, the remote device 500 may communicate to the building control device 200 over the network 504 to send the current temperature of the space. As such, the building control device 200 may obtain a current temperature estimate for the space using the sensors 212A-212E, similar to the approach discussed above in regard to FIG. 3. Once the building control device 200 has determined the temperature estimate, the building control device 200 may send the temperature estimate for the space to the remote device 500 over the network 504. The remote device 500 may then display the temperature estimate on the display 506 to the user.

A recap may be provided. In an example of the disclosure, a building control device for estimating temperature of a space may incorporate a set of environmental sensors having a set of operational environmental states and configured to detect environmental conditions. The building control device may also include a memory configured to store the set of operational environmental states and a probability distribution for each of the operational environmental states. The building control device may also include a controller operatively coupled to the user interface, the set of environmental sensors, and the memory. The controller may be configured to receive detected environmental conditions from the set of environmental sensors, identify a subset of the set of operational environmental states from the memory based on the detected environmental conditions, obtain a probability distribution for each of the subset of operational environmental states from the memory, determine, based on the probability distribution, a set of temperature estimates and a probability estimate for each temperature estimate for the subset of operational environmental states, identify an operational environmental state, from the subset of operational environment states, at which the set of environmental sensors are likely operating based on the probability estimate for each temperature estimate, select a temperature estimate, from the set of temperature estimates, for the operational environmental state at which the set environmental sensors are likely operating, and generate the selected temperature estimate.

Alternatively or additionally to the foregoing, the building control device may further incorporate a user interface including an input device configured to receive user input, and a display configured to display temperature estimates.

Alternatively or additionally to any of the embodiments above, the controller may be further configured to display the selected temperature estimate on the display.

Alternatively or additionally to any of the embodiments above, the selected temperature estimate may be used to control an operation of an HVAC unit.

Alternatively or additionally to any of the embodiments above, the selected temperature estimate may have a highest probability estimate out of all the determined probability estimates for each temperature estimate.

Alternatively or additionally to any of the embodiments above, the selected temperature estimate may be based on an interpolation of the probability estimate for each temperature estimate.

Alternatively or additionally to any of the embodiments above, the set of environmental sensors may include two or more microelectronic sensors.

Alternatively or additionally to any of the embodiments above, for each of the set of operational environmental states, the controller may be further configured to receive a calibration model and a set of initial conditions, compute a first error for each environmental sensor from the set of environmental sensors and a second error for each of a combination of environmental sensors from the set of environmental sensors based on the calibration model and the set of initial conditions, and compute the probability distribution using the first error for each of the environmental sensor and the second set of error for each of the combination of the environmental sensors.

Alternatively or additionally to any of the embodiments above, the building control device may further incorporate a housing, wherein the set of environmental sensors, the memory, and the controller are disposed within the housing.

Alternatively or additionally to any of the embodiments above, the detected environmental conditions from the set of environmental sensors may include at least temperature outside the housing and temperature inside the housing.

Alternatively or additionally to any of the embodiments above, the subset of operational environmental states may be identified from the memory based on the temperature outside the housing falling within a range of outside temperatures and the temperature inside the housing falling within a range of inside temperatures for each of the subsets of operational environmental states.

Alternatively or additionally to any of the embodiments above, each of the set of operational environmental states may be bounded by a range of temperatures.

Alternatively or additionally to any of the embodiments above, the building control device may incorporate a thermostat.

In another example of the disclosure, a building control device for estimating temperature of a space may incorporate a set of environmental sensors having a set of operational environmental states and configured to detect environmental conditions. The building control device may also include a memory configured to store the set of operational environmental states and a probability distribution for each of the operational environmental states. The building control device may also include a controller operatively coupled to the user interface, the set of environmental sensors, and the memory. The controller may be configured to receive detected environmental conditions from the set of environmental sensors, identify a subset of the set of operational environmental states from the memory based on the detected environmental conditions, obtain a probability distribution for each of the subsets of operational environmental states from the memory, determine, based on the probability distribution, a set of temperature estimates and a probability estimate for each temperature estimate for the subset of operational environmental states, identify an operational environmental state, from the subset of operational environment states, at which the set of environmental sensors are likely operating based on the probability estimate for each temperature estimate, select a temperature estimate, from the set of temperature estimates, for the operational environmental state at which the set environmental sensors are likely operating, and control an operation of an HVAC unit based on the selected temperature estimate.

Alternatively or additionally to any of the embodiments above, the building control device may further incorporate an input/output (I/O) port that may be configured to communicate with a remote device.

Alternatively or additionally to any of the embodiments above, the controller may be further configured to receive a request for the selected temperature estimate from the remote device via the I/O device, and send the selected temperature estimate to the remote device in response to the request.

Alternatively or additionally to any of the embodiments above, the set of environmental sensors may include two or more microelectronic sensors.

Alternatively or additionally to any of the embodiments above, the building control device may incorporate a thermostat.

In another example of the disclosure, a system for estimating temperature of a space may incorporate a remote device that includes a user interface that may have a display configured to display temperature estimates. The system may also include a building control device. The building control device may include an input/output (I/O) port configured to communicate with the remote device, a set of environmental sensors having a set of operational environmental states and configured to detect environmental conditions, a memory configured to store the set of operational environmental states and a probability distribution for each of the operational environmental states, and a controller operatively coupled to the user interface, the set of environmental sensors, and the memory. The controller may be configured to receive detected environmental conditions from the set of environmental sensors, identify a subset of the set of operational environmental states from the memory based on the detected environmental conditions, obtain a probability distribution for each of the subsets of operational environmental states from the memory, determine, based on the probability distribution, a set of temperature estimates and a probability estimate for each temperature estimate for the subset of operational environmental states, identify an operational environmental state, from the subset of operational environment states, at which the set of environmental sensors are likely operating based on the probability estimate for each temperature estimate, select a temperature estimate, from the set of temperature estimates, for the operational environmental state at which the set environmental sensors are likely operating, and display the selected temperature estimate on the display of the remote device.

Alternatively or additionally to any of the embodiments above, the system may further incorporate an HVAC system that may be configured to communicate with the building control device, wherein the selected temperature estimate may be used to control an operation of an HVAC unit.

Examples of approaches described herein may be machine or computer-implemented at least in part. Some examples may include a computer-readable medium or machine-readable medium encoded with instructions operable to configure an electronic device to perform approaches as described in the above examples. An implementation of such approaches may include code, such as microcode, assembly language code, a higher-level language code, or the like. Such code may include computer readable instructions for performing various approaches. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic or optical disks, magnetic cassettes, memory cards or sticks, random access memories (RAMs), read only memories (ROMs), and the like.

Any publication or patent document directly or indirectly noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

The above description is intended to be illustrative, and not restrictive. For example, the above-described examples (or one or more aspects thereof) may be used in combination with each other. Also, in the above Description, various features may be grouped together to streamline the disclosure. This should not be interpreted as intending that an unclaimed disclosed feature is necessarily needed in any claim. Rather, subject matter of the present system and approach may lie in less than all features of a particular disclosed embodiment. Thus, the following claims are hereby incorporated into the Description as examples or embodiments, with each claim standing on its own as a separate embodiment, and it is contemplated that such embodiments may be combined with each other in various combinations or permutations.

What is claimed is:

1. A building control device for estimating temperature of a space, the building control device comprising:
   a set of environmental sensors having a set of operational environmental states and configured to detect environmental conditions;
   a memory configured to store the set of operational environmental states and a probability distribution for each of the operational environmental states; and
   a controller operatively coupled to the user interface, the set of environmental sensors, and the memory and configured to:
      receive detected environmental conditions from the set of environmental sensors;
      identify a subset of the set of operational environmental states from the memory based on the detected environmental conditions;
      obtain a probability distribution for each of the subset of operational environmental states from the memory;
      determine, based on the probability distribution, a set of temperature estimates and a probability estimate for each temperature estimate for the subset of operational environmental states;
      identify an operational environmental state, from the subset of operational environment states, at which the set of environmental sensors are likely operating based on the probability estimate for each temperature estimate;
      select a temperature estimate, from the set of temperature estimates, for the operational environmental state at which the set environmental sensors are likely operating; and
      generate the selected temperature estimate.

2. The building control device of claim 1, further comprising:
   a user interface including:
   an input device configured to receive user input; and
   a display configured to display temperature estimates.

3. The building control device of claim 2, wherein the controller is further configured to display the selected temperature estimate on the display.

4. The building control device of claim 1, wherein the selected temperature estimate is used to control an operation of an HVAC unit.

5. The building control device of claim 1, wherein the selected temperature estimate has a highest probability estimate out of all the determined probability estimate for each temperature estimate.

6. The thermostat of claim 1, wherein the selected temperature estimate is based on an interpolation of the probability estimate for each temperature estimate.

7. The building control device of claim 1, wherein the set of environmental sensors includes two or more microelectronic sensors.

8. The building control device of claim 1, wherein for each operational environmental state of the set of operational environmental states the controller is further configured to:
   receive a calibration model and a set of initial conditions;
   compute a first error for each environmental sensor from the set of environmental sensors and a second error for each of a combination of environmental sensors from the set of environmental sensors based on the calibration model and the set of initial conditions; and
   compute the probability distribution using the first error for each of the environmental sensor and the second error for each of the combination of the environmental sensors.

9. The building control device of claim 1, further comprising a housing, wherein the set of environmental sensors, the memory, and the controller are disposed within the housing.

10. The building control device of claim 9, wherein the detected environmental conditions from the set of environmental sensors includes at least temperature outside the housing and temperature inside the housing.

11. The building control device of claim 10, wherein the subset of operational environmental states is identified from the memory based on the temperature outside the housing falling within a range of outside temperatures and the temperature inside the housing falling within a range of inside temperatures for each operational environmental state of the subset of operational environmental states.

12. The building control device of claim 1, wherein each of the set of operational environmental states is bounded by a range of temperatures.

13. The building control device of claim 1, wherein the building control device comprises a thermostat.

14. A building control device for estimating temperature of a space, the building control device comprising:
- a set of environmental sensors having a set of operational environmental states and configured to detect environmental conditions;
- a memory configured to store the set of operational environmental states and a probability distribution for each of the operational environmental states; and
- a controller operatively coupled to the user interface, the set of environmental sensors, and the memory and configured to:
  - receive detected environmental conditions from the set of environmental sensors;
  - identify a subset of the set of operational environmental states from the memory based on the detected environmental conditions;
  - obtain a probability distribution for each of the subset of operational environmental states from the memory;
  - determine, based on the probability distribution, a set of temperature estimates and a probability estimate for each temperature estimate for the subset of operational environmental states;
  - identify an operational environmental state, from the subset of operational environment states, at which the set of environmental sensors are likely operating based on the probability estimate for each temperature estimate;
  - select a temperature estimate, from the set of temperature estimates, for the operational environmental state at which the set environmental sensors are likely operating; and
  - control an operation of an HVAC unit based on the selected temperature estimate.

15. The building control device of claim 14, further comprising an input/output (I/O) port configured to communicate with a remote device.

16. The building control device of claim 15, wherein the controller is further configured to:
- receive a request for the selected temperature estimate from the remote device via the I/O device; and
- send the selected temperature estimate to the remote device in response to the request.

17. The building control device of claim 14, wherein the set of environmental sensors includes two or more microelectronic sensors.

18. The building control device of claim 14, wherein the building control device comprises a thermostat.

19. A system for estimating temperature of a space, the system comprising:
- a remote device including a user interface having a display configured to display temperature estimates; and
- a building control device including:
  - an input/output (I/O) port configured to communicate with the remote device;
  - a set of environmental sensors having a set of operational environmental states and configured to detect environmental conditions;
  - a memory configured to store the set of operational environmental states and a probability distribution for each of the operational environmental states; and
  - a controller operatively coupled to the user interface, the set of environmental sensors, and the memory and configured to:
    - receive detected environmental conditions from the set of environmental sensors;
    - identify a subset of the set of operational environmental states from the memory based on the detected environmental conditions;
    - obtain a probability distribution for each of the subset of operational environmental states from the memory;
    - determine, based on the probability distribution, a set of temperature estimates and a probability estimate for each temperature estimate for the subset of operational environmental states;
    - identify an operational environmental state, from the subset of operational environment states, at which the set of environmental sensors are likely operating based on the probability estimate for each temperature estimate;
    - select a temperature estimate, from the set of temperature estimates, for the operational environmental state at which the set environmental sensors are likely operating; and
    - display the selected temperature estimate on the display of the remote device.

20. The system of claim 19, further comprising an HVAC system configured to communicate with the building control device, wherein the selected temperature estimate is used to control an operation of an HVAC unit.

* * * * *